United States Patent [19]

Busson et al.

[11] 4,058,591

[45] Nov. 15, 1977

[54] PROCESS FOR PURIFYING WASTE WATER CONTAINING AMMONIUM SULFATE

[75] Inventors: Christian Busson, Rueil-Malmaison; Jacques Alagy, Lyon; Maurice Cessou, Communay, all of France

[73] Assignee: Institut Francais du Petrole, Rueil-Malmaison, France

[21] Appl. No.: 607,802

[22] Filed: Aug. 26, 1975

[30] Foreign Application Priority Data

Sept. 5, 1974 France .................................. 74.30412

[51] Int. Cl.$^2$ ..................... C01B 17/02; C02B 1/34; C02C 5/06

[52] U.S. Cl. .................................. 423/574 R; 210/45; 210/47; 210/52; 423/356; 423/541 A

[58] Field of Search ............... 423/356, 541, 542, 547, 423/548, 549, 555, 566, 575, 574; 210/45, DIG. 1, 47, 52

[56] References Cited

U.S. PATENT DOCUMENTS

| | | | |
|---|---|---|---|
| 1,108,705 | 8/1914 | Cobb ................................. | 423/548 X |
| 1,274,247 | 7/1918 | Danneel et al. ...................... | 423/547 |
| 2,856,267 | 10/1958 | Kamlet .............................. | 423/566 X |
| 2,862,789 | 12/1958 | Burgress ............................ | 423/545 X |
| 3,561,925 | 2/1971 | Deschamps et al. ................. | 423/356 |
| 3,729,551 | 4/1973 | Gorin ............................... | 423/566 X |
| 3,862,335 | 1/1975 | Renault et al. ...................... | 423/575 |

FOREIGN PATENT DOCUMENTS

378,684  8/1932  United Kingdom ................. 423/547

*Primary Examiner*—O. R. Vertiz
*Assistant Examiner*—Gary P. Straub
*Attorney, Agent, or Firm*—Millen & White

[57] ABSTRACT

This process for purifying waste-water containing ammonium sulfate comprises reacting said waste-water with calcium oxide, calcium sulfide and ammonium sulfite; roasting the resulting precipitate to regenerate calcium oxide and calcium sulfide; and reacting sulfur dioxide with hydrogen sulfide obtained in a prior step to yield sulfur.

8 Claims, 1 Drawing Figure

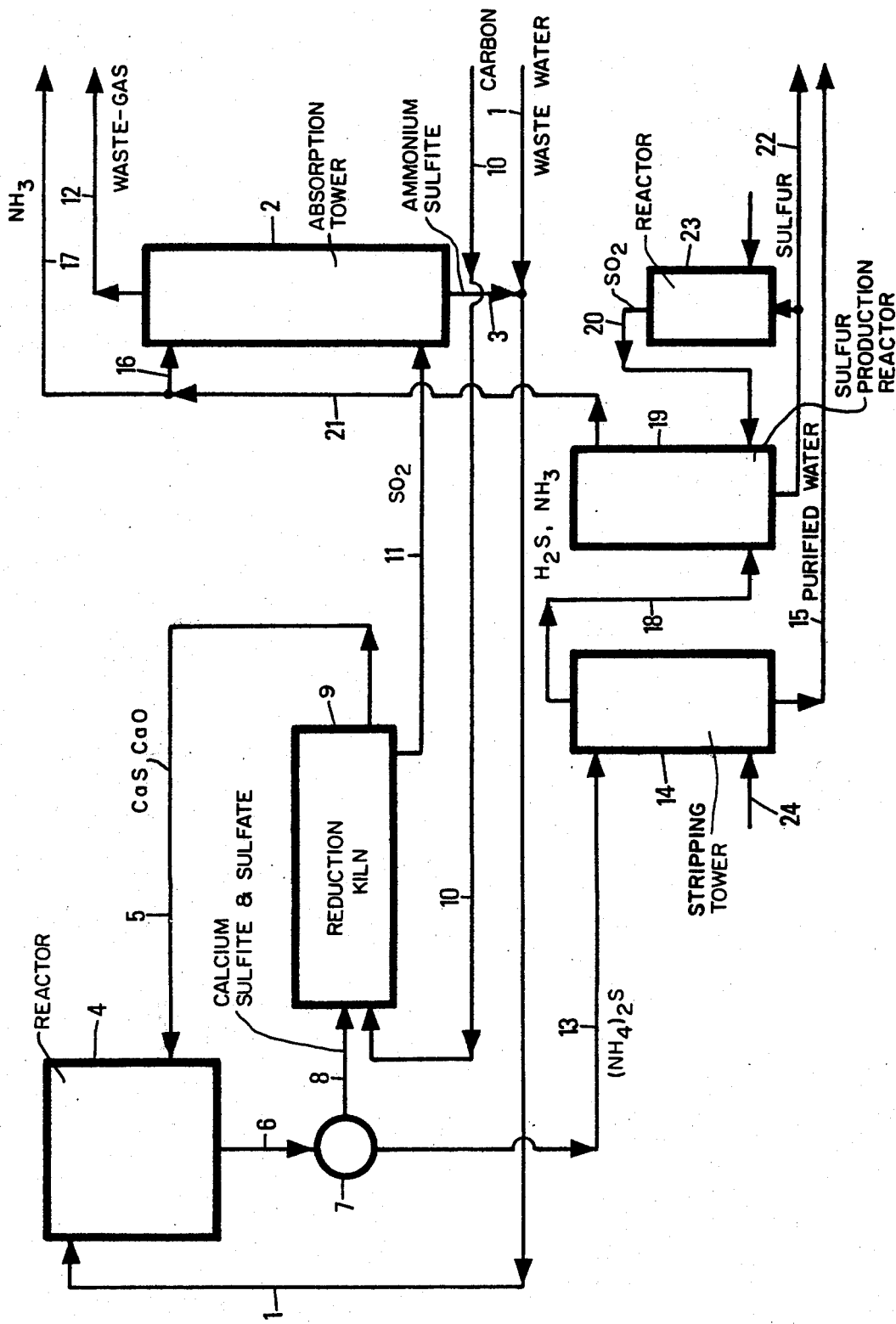

PROCESS FOR PURIFYING WASTE WATER CONTAINING AMMONIUM SULFATE

Several techniques for treating waste-water containing sulfuric acid, ammonium sulfate and/or heavy metal sulfates have been described in previous French Pat. Nos. EN 73/42940, 73/24127, 73/43318 and 74/08095.

All prior embodiments comprised the use of barium sulfide, as obtained by selective reduction of barium sulfate by means of carbon, according to the reaction:

$$BaSO_4 + 2 C \rightarrow BaS + 2 CO_2$$

The use of calcium sulfide, a reactant which is less expensive and easier to handle than barium sulfide, could not be expected to be satisfactory, due to the poor yield of calcium sulfide obtained during the calcium sulfate reduction.

In fact, the reduction of calcium sulfate, usually carried out at 900°–1200° C, yields a mixture of CaO and CaS according to the following simplified scheme:

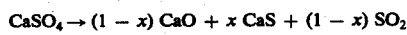

$$CaSO_4 \rightarrow (1 - x) CaO + x CaS + (1 - x) SO_2$$

Carbon oxides and water are also formed.

Depending on the conditions prevailing in the reduction kiln, calcium oxide and calcium sulfide may be obtained in a molar ratio of CaS to CaO from 0 to about 5 to 10, the maximal values corresponding to the known limit of selectivity of the reduction of $CaSO_4$ to CaS by known methods. It is thus impossible to obtain calcium sulfide as the sole product of this reaction.

The process of this invention obviates this difficulty and permits the purification of waste-water containing ammonium sulfate and possibly soluble metal sulfates, by means of a mixture of CaS and CaO in any proportion. It also permits the recovery of the major part of sulfur in the form of elemental sulfur.

The metal sulfates, when present, are recovered in the form of sulfides and/or hydroxides, settled and filtered. When recovered as sulfides, they can be optionally subjected to roasting. Dilute $SO_2$ thus produced is then reintroduced into the recovery circuit.

The process according to the invention comprises:

a. reacting waste water with a mixture of calcium oxide and calcium sulfide and with ammonium sulfite, and then separating the resulting mixture of insoluble calcium sulfate and calcium sulfite from the aqueous phase, b. heating the mixture of calcium sulfite and calcium sulfate with carbon to the temperature of reduction of calcium sulfate to obtain a gas containing sulfur dioxide and a mixture of calcium oxide and calcium sulfide, and recycling said mixture to step (a), c. heating aqueous phase obtained in step (a) to produce a gas containing hydrogen sulfide and ammonia, d. reacting the gas produced in step (c) with sulfur dioxide, thereby producing sulfur and an ammonia containing gas, and separating said sulfur, e. separating a fraction of the ammonia containing gas recovered from step (d) and contacting another fraction of said gas with water and the gas containing sulfur dioxide recovered from step (b), thereby forming ammonium sulfite, f. recycling to step (a) at least a fraction of the ammonium sulfite recovered from step (e).

By ammonium sulfite in step (a), we mean ammonium sulfite or bisulfite or a mixture of both. We usually employ an aqueous solution of both ammonium sulfite and bisulfite (molar ratio $NH_3/SO_2$ from 1 to 2 preferably 1.2 to 1.6). Step (a) is usually carried out at a pressure close to atmospheric, and preferably at a temperature from 0° to 100° C.

The ammonium sulfites are preferably employed in an amount of about one mole of combined $SO_2$ per mole of calcium oxide.

The molar ratio of CaS to CaO is preferably selected to be as high as possible. Below a ratio of 0.5, the process is less advantageous the usual values being 3 to 5 or more if obtainable, for example up to 10.

We preferably employ about 1 mole of calcium sulfide per mole of ammonium sulfate.

The reaction time is usually from 5 minutes to 2 hours.

The settled fraction, which consists of calcium sulfite and calcium sulfate, is filtered and, if necessary, washed, and the filtrate containing ammonium sulfide and ammonia is fed to a stripping section for recovering ammonia and hydrogen sulfide. This steam-stripping section may comprise one single column; it may also comprise two columns since hydrogen sulfide can be stripped more easily than ammonia when both are to be stripped. The stripping temperature may be, for example, 80°–120° C.

The calcium sulfate and calcium sulfite cake is charged into the reduction kiln together with carbon. The amount of carbon and the other operating conditions are so adjusted as to obtain the conversion of at least a part of $CaSO_4$ to CaO and CaS in selected proportions. As the carbon source, we may use coke, coal or hydrocarbons, irrespective of their sulfur content.

During reduction, dilute sulfur dioxide appears in the gas discharged from the kiln; when necessary, this gas is fed to an incinerator to convert all sulfur compounds to $SO_2$.

When water has been freed of $H_2S$ and $NH_3$ by stripping, it is discharged as purified water. Wherever desired, a fraction of this water may be utilized to dilute certain streams, for example, the feed charge.

Ammonia and hydrogen sulfide recovered from the top of the stripping section are supplied to a reactor where they are reacted with $SO_2$ in a solvent to produce sulfur according to a known technique. This technique results in the production of elemental sulfur and the liberation of a gas containing a high proportion of ammonia and substantially no sulfur compounds.

$SO_2$ may be obtained by burning a portion of the produced sulfur.

Ammonia, optionally after dissolution in water, may be used:

to neutralize acid streams and raise the pH to a convenient value for the settling operation;

to absorb dilute $SO_2$ contained in the waste-gas of the process and thus constitute the aqueous solution of ammonium sulfite and/or bisulfite to be used at the beginning of the treatment for being contacted with the charge of waste water;

as a product of the plant.

The described process comprises several alternative embodiments:

1. Controlled oxidation of the sulfite solution in the $SO_2$ recovery tower, to avoid any formation of thiosulfate by reaction of sulfites with sulfides.

2. When working with concentrated waste waters, the sulfates can be precipitated by means of a powdered mixture of CaO and CaS, to obtain a half-solid paste to be treated according to a previously described scheme (EN 7408095).

3. When soluble metal sulfates are present in the waste water, the latter may be treated with ammonia and/or hydrogen sulfide according to known processes, to precipitate metal hydroxides and sulfides either separately or in admixture. This operation, which is carried out before step (a) of the process, may be conducted in by 3 distinct methods, well known to those skilled in the art:
1. Hydroxides settling by means of ammonia; separation of the hydroxides by filtration and washing; precipitation of the sulfides by means of hydrogen sulfide in an ammonia medium;

These operations are usually carried out at a pressure close to atmospheric and at about 50°–80° C.
2. Simultaneous action of ammonia and hydrogen sulfide to simultaneously precipitate hydroxides and sulfides; separation of the co-precipitate and washing.
3. Hydroxides settling by means of ammonia, then settling of the sulfides on the previously formed hydroxides by means of hydrogen sulfide. Separation of the co-precipitate and washing.

Depending on the nature of the metals to precipitate, the amounts of $NH_3$ and $H_2S$ may be adjusted in such a manner as to entirely precipitate these metals. When a selective separation of certain metals, which can settle as sulfides in an acidic medium, is desired, it is necessary to acidify the medium, to carry out the hydrogen sulfide treatment before the ammonia treatment and to proceed with intermediate filtration of the so-settled sulfides.

When the amount of settled metal sulfides justifies a recovery of the sulfur thus carried along, this can be made by roasting of the precipitates according to a known method. The fumes formed in this roasting step contain dilute $SO_2$ and are joined to other streams of fumes of simular composition and treated as such in another part of the plant, as described later.

BRIEF DESCRIPTION OF THE DRAWING

The attached drawing is a schematic flowsheet of the preferred comprehensive embodiment of the invention, and it is further described in detail in the following examples demonstrate the various advantages of the process and its wide field of application.

To facilitate the understanding of the description, reaction balances without losses have been reported, and we have voluntarily neglected those side reactions, which lead to by-products not detrimental to the process or which may be removed in a known manner, for example by purge of derived streams. We have also neglected to mention water formation or its conversion by chemical reaction. All these features give a better view of the invention as claimed.

These examples are given for illustration purpose; they are not binding in any respect whatsoever.

EXAMPLE 1

This example is based on 1 kmole of ammonium sulfate.

The sulfitic solution containing 0.1 kmole of $NH_4HSO_3$ and 0.1 kmole of $(NH_4)_2SO_3$ line 3 is admixed with the solution to be treated, containing 1 kmole of $(NH_4)_2SO_4$ line 1, in reactor 4 also fed with 1 kmole of CaS and 0.2 kmole of CaO discharged through line 5 from the reactor 9 for $CaSO_4$ reduction.

The reaction which takes place is the following:

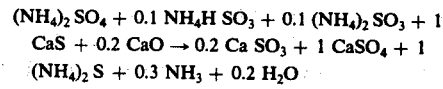

During this reaction, which results in the settling of insoluble calcium sulfites and sulfates, it is difficult to avoid the formation of thiosulfates.

The amount of calcium added to the medium must be carefully adjusted in order to obtain these thiosulfates in the form of soluble ammonium salts. The loss as thiosulfate is estimated to 1 to 5 % of the initial sulfites.

The precipitate is filtered, washed in filter 7 and supplied through line 8 to the reduction kiln 9. 2 kmoles of carbon are also supplied to this kiln through line 10. The temperature is about 1,100° C.

The reduction takes place as follows:

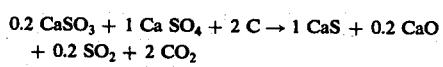

The formation of CaO cannot be avoided, irrespective of the amount of carbon to be used. Dilute $SO_2$ discharged through line 11 from the kiln is subjected to further roasting before being fed to the absorption tower 2. The purified gas is discharged through line 12.

The mixture of CaS and CaO is fed to reactor 4 through line 5. The filtrate from filter 7 is passed through line 13 to the stripping tower 14 also fed with steam through line 24. 2.3 kmoles of $NH_3$ and 1 kmole of $H_2S$ line 18 are discharged from the top of the stripping column and fed to the sulfur production reactor 19 containing liquid polyethylene glycol at the temperature of 130° C.

Purified water is discharged through line 15.

It contains 1500 ppm by weight of calcium, as $CaSO_4$ and less than 100 ppm by weight of $H_2S$ and $NH_3$.

0.5 kmole of $SO_2$ line 20 is also supplied to this reactor, thereby producing 1.5 kmole of elemental sulfur according to a known technique as follows:

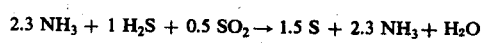

A fraction of the produced sulfur (0.5 kmole) is burnt in a burner associated with reactor 23 to produce $SO_2$ required for this reaction (0.5 kmole). The net sulfur production is 1 kmole line 22.

Ammonia is recovered from the top of reactor 19 through line 21 and is divided into two streams. A first stream of 0.3 kmole is supplied to the absorption zone through line 16. A second stream of 2 kmoles $NH_3$ is discharged from the plant as final product of the reaction, in the form of an aqueous ammonia solution line 17.

The reaction:

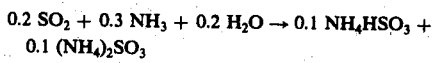

is carried out in absorption tower 2.

The overall equation of the process is:

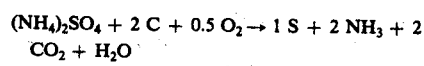

The sulfur practical yield is 99 %.
The ammonia practical yield is 95 %.

EXAMPLE 2

Example 1 is repeated by using 1 kmole of ammonium sulfate, 0.5 kmole of $NH_4HSO_3$, 0.5 kmole of $(NH_4)_2SO_3$, 1 kmole of CaS and 1 kmole of CaO.

The precipitate comprises 1 kmole of $CaSO_4$, 1 kmole of $CaSO_3$ and the aqueous phase comprises 1 kmole $(NH_4)_2S$ and 1.5 kmole of $NH_3$.

The amount of carbon to be used for the reduction is unchanged and there are obtained 1 kmole of CaS, 1 kmole of CaO and 1 kmole of $SO_2$.

The filtrate is stripped, thereby releasing 1 kmole of $H_2S$ and 3.5 kmole of $NH_3$.

The net sulfur production is 1 kmole. Ammonia is recovered and divided into 2 streams: one (1.5 kmole) is supplied to the $SO_2$ absorption zone; the other one (2 kmoles) is a product of the process.

The practical sulfur recovery yield is 98.5 %.
The practical ammonia recovery yield is 95 %.

We claim:

1. A process for treating waste water containing ammonium sulfate to recover elemental sulfur, which comprises the steps of:
   a. reacting said waste water with a mixture of calcium oxide and calcium sulfide and with recycled ammonium sulfite from step (f), the molar ratio CaS/CaO being at least 0.5:1 and the amounts of the reactants being sufficient to form simultaneously insoluble calcium sulfate, insoluble calcium sulfite, and ammonium sulfide dissolved in the aqueous phase and then separating the resulting mixture of insoluble calcium sulfate and calcium sulfite from the aqueous phase,
   b. heating the mixture of calcium sulfite and calcium sulfate with carbon to the temperature of reduction of calcium sulfate to obtain a gas containing sulfur dioxide and a mixture of calcium oxide and calcium sulfide, and recycling said mixture to step (a),
   c. stripping the aqueous phase obtained in step (a) to separate therefrom a gas containing hydrogen sulfide and ammonia, and discharging resultant residual aqueous phase,
   d. reacting the gas separated in step (c) with sulfur dioxide, thereby producing sulfur and ammonia containing gas, and separating said sulfur,
   e. dissolving at least a fraction of the ammonia containing gas recovered from step (d) with water together with the gas containing sulfur dioxide recovered from step (b), thereby forming ammonium sulfite,
   f. recycling to step (a) at least a fraction of the ammonium sulfite recovered from step (e).

2. A process according to claim 1, wherein the amount of calcium sulfide is about 1 mole per mole of ammonium sulfate and the amount of ammonium sulfite is about 1 mole, expressed as sulfur dioxide in the form of sulfite, per mole of calcium oxide.

3. A process according to claim 1, wherein calcium oxide and calcium sulfide are used in a molar ratio CaS/CaO of 3:1 to 10:1.

4. A process according to claim 1, wherein sulfur dioxide used in step (d) is obtained by burning a fraction of the sulfur produced in the same step.

5. A process according to claim 1, wherein the ammonium sulfite used in step (a) is employed as an aqueous solution of ammonium sulfite and ammonium bisulfite in a molar ratio of $NH_3$ to $SO_2$ from 1.2 to 1.6.

6. A process according to claim 1, wherein the waste water also contains soluble metal sulfates capable of forming metal sulfide and metal hydroxide substantially insoluble in water and further comprising the preliminary steps of treating the waste water with hydrogen sulfide or ammonia to precipitate the metals in the form of sulfides or hydroxides, separating the precipitate and supplying the resulting aqueous phase to step (a).

7. A process according to claim 6, wherein hydrogen sulfide and ammonia are supplied in the form of ammonium sulfide.

8. A process according to claim 6, wherein hydrogen sulfide or ammonium sulfide are used, and the formed metal sulfides are subsequently roasted to produce sulfur dioxide to be used in the process.

* * * * *